United States Patent [19]

De Werdt

[11] 3,721,592

[45] March 20, 1973

[54] ETCHING METHOD EMPLOYING AN ETCHING MASK WHILE SUPPRESSING UNDERETCHING

[75] Inventor: Reiner De Werdt, Emmasingel, Eindhoven, Netherlands

[73] Assignee: U.S. Philips Corporation, New York, N.Y.

[22] Filed: May 4, 1970

[21] Appl. No.: 34,489

[30] Foreign Application Priority Data

May 22, 1969 Netherlands ........................6907831

[52] U.S. Cl. ........................156/11, 156/17, 148/1.5, 148/187, 96/36.2

[51] Int. Cl. ................................................C23f 1/02

[58] Field of Search .......156/11, 17, 13, 14; 96/36.2, 96/36, 35; 148/187; 117/212, 217; 29/578

[56] References Cited

UNITED STATES PATENTS

| | | | |
|---|---|---|---|
| 3,421,985 | 1/1969 | Baker et al. | 156/17 |
| 3,458,370 | 7/1969 | Cone | 156/11 |
| 3,542,551 | 11/1970 | Rice | 156/11 |
| 3,544,401 | 12/1970 | Jarman | 156/13 |
| 3,255,005 | 6/1966 | Green | 96/36 |
| 3,388,000 | 6/1968 | Waters et al. | 117/212 |
| 3,269,861 | 8/1966 | Schneble et al. | 117/212 |

FOREIGN PATENTS OR APPLICATIONS

| | | |
|---|---|---|
| 1,035,122 | 7/1966 | Great Britain |

*Primary Examiner*—Robert F. Burnett
*Assistant Examiner*—R. J. Roche
*Attorney*—Frank R. Trifari

[57] ABSTRACT

The invention relates to etching with the aid of a mask while limiting underetching as much as possible by using an etchresistant and stable mask and by filling up after some time of etching, the cavities produced by underetching underneath the metal film with an etch-resistant resist by means of a photomechanical method.

5 Claims, 12 Drawing Figures

PATENTED MAR 20 1973 3,721,592

INVENTOR.
REINIER DE WERDT
BY
AGENT.

ETCHING METHOD EMPLOYING AN ETCHING MASK WHILE SUPPRESSING UNDERETCHING

The invention relates to a method of etching surfaces while using an etching mask which shields part of the surface from the etchant.

When etching surfaces part of which is covered with a mask resistant to the etchant usually also part of the surface underneath the mask is etched. This unwanted underetching generally takes place at the same or even at a greater rate than etching in a direction perpendicular to the surface. Particularly, underetching leads to unwanted results in those cases where the etching depth is of the same order as the dimensions of the parts of the surface covered with the mask.

Underetching may likewise occur when slits are present between the mask and the surface to be etched.

In some cases the extent of underetching may be limited by etching in a number of stages, a new mask being provided between each stage. This method is rather cumbersome because the provision of each new mask requires careful registering of this mask on the etched surface.

A method is known from United Kingdom patent specification 1,035,122 wherein etching is likewise performed in a number of stages. Between each stage a layer which is resistant to the etchant is provided on the sides of the etched-out parts. According to this patent specification this can be done, inter alia, by pressing the etched surface on a layer of a material capable of being displaced so that an impression of the etched surface is formed. The impression or mold thus formed is filled with a material from which a layer resistant to the etchant can be obtained, and the etched plate is pressed in the filled mold. In accordance with a further method likewise described in this patent specification the etched surface is rubbed in different directions on a layer of the material from which a layer resistant to the etchant can be obtained.

The methods proposed are comparatively cumbersome. In a number of cases, particularly in the etching of intricate patterns having small dimensions of the etched-out parts, it is improbable to avoid underetching in a reliable manner. In addition there is a risk of damaging the etched-out parts.

The object of the present invention is to prevent underetching or to limit it to an unharmful degree in a reliable and simple manner while avoiding mask registration between etching steps.

According to the invention this can be achieved by providing on the surface to be etched a non-deforming mask which is impermeable at least to the radiation which is used in a subsequent stage of the method and which is resistant to the etchant, and subsequently, or after the surface is etched until an admissible extent of underetching has been reached, the surface is coated with a positive photoresist whereafter the resist layer is exposed to radiation, the exposed parts of the resist layer being removed and the bared parts of the surface being etched. In this connection a non-deforming or non-deformable mask is to be understood to mean a mask which retains its shape during the several steps of the method according to the invention. The thickness of the mask required for obtaining such a non-deformability is not exclusively dependent on the properties of the material of the mask and possible treatments which it has undergone but partly also on the dimensions of the parts of the surface to be etched out and to be protected from the etchant, and on the etching depth.

The surface to be etched may consist of any material, such as, a metal, an oxide or other material, which can be etched. A mask may be provided on the surface to be etched in different methods known in the art, for example, by first coating the surface to be etched with a thin metal layer, such as, by means of an electrolytic or an electroless method and by subsequently selectively etching away part of the metal layer. When using this method it is thus necessary to choose a metal which can be etched by means of an etchant which does not attack the base material. It is alternatively possible to provide a mask by means of vapor deposition and growing in accordance with a certain pattern. When using a metal mask a sufficient non-deformability is generally already obtained in case of a thickness in the order of 0.1 $\mu$m.

The mask must consist of a material which is resistant to the etchant used for etching the surface. Furthermore it is necessary that the mask is impermeable at least to the radiation which is used to expose the positive photoresist during a following step in the method.

The mask may consist of any material which satisfies these requirements and which can be provided on the surface to be etched in a uniform layer which is not too thick. It has been found that particularly certain metals such as nickel, chromium, gold and silver are suitable for this purpose. It is alternatively possible to manufacture the mask from a photoresist. When using a positive photoresist the layer remaining on the surface after exposure and development is heated to such an extent that a chemical change occurs causing the layer to become insoluble in the resist provided later on and in the solvents used therein. It is alternatively possible to use a negative photoresist for the manufacture of the mask.

In some cases the edges of the mask parts do not adhere sufficiently to the surface to be etched when the mask is provided. In such cases the photoresist is provided immediately on the surface to be etched or after a relatively short etching period, during which the space under the mask is slightly enlarged, on the parts both covered by the mask and the uncovered parts, while also the capillary spaces or slits or crevices between the mask and the surface to be etched are filled up with photoresist.

In other cases the mask and the surface to be etched do adhere sufficiently. In such a case the surface is etched first until the maximum permissible underetching depth has been reached. During this etching operation a cavity or slit or crevice is formed in the surface under the edges of the parts of the mask. These cavities and slits are filled up with photoresist and are thereby protected from further etching by providing a positive photoresist onto the surface in the manner as already previously described. After radiation exposure and development a protection is obtained in both cases for those parts of the surface under the mask which incur the risk of being attacked by the etchant.

During exposure of the positive photoresist the etching mask functions as a shadow mask.

It is evident that the method may be repeated several times if necessary always after some time of etching until the maximum permissible underetching depth has been reached.

In this connection a positive photoresist is understood to mean a resist by which a layer can be obtained whose rediation exposed parts, after exposure, are more soluble in given solvents than its unexposed parts.

Several positive photoresists are commercially available.

In order that the invention may be readily carried into effect, a few embodiments thereof will now be described in detail, by way of example, with reference to the accompanying diagrammatic drawing, in which.

EXAMPLE I

This example relates to etching out a raised pattern in a metal plate, the etching depth being equal to or larger than half the width of the narrowest part of the raised pattern.

Figure 1:
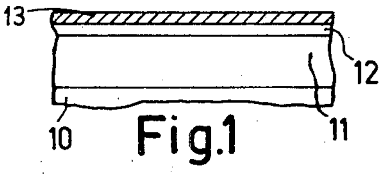
FIGS. 1 to 6 show stages of an embodiment of the method according to the invention in which etching is performed after providing the mask and before providing the photoresist.
Figure 2:
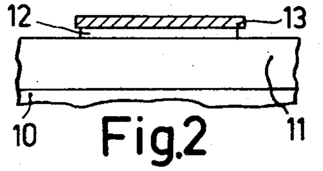

A nickel layer 12 to serve as a mask was provided by vapor deposition in a vacuum onto an aluminum layer 11 (FIG. 1) to be etched having a thickness of 3.5 $\mu$m provided on glass 10. The nickel layer 12 has a thickness of 0.1 $\mu$m. Subsequently a layer 13 of a positive photoresist was provided onto the nickel layer 12. However, it is alternatively possible to use a negative photoresist during this stage of the method wherein the mask outline is determined. The photoresist layer 13 was subsequently exposed to sensitizing radiation, a mask (not shown) being provided between the light source and the photoresist layer which mask shields those portions of the photoresist from exposure which must function as an etch-resistant layer during the next stage of the method. The exposed parts of the photoresist layer were subsequently dissolved in a developer suitable for this purpose whereafter the parts of the nickel layer not coated with photoresist were etched away by means of diluted nitric acid (10 vol.%) (FIG. 2). The width of the path to be etched out is 4.5 $\mu$m.

Figure 3:
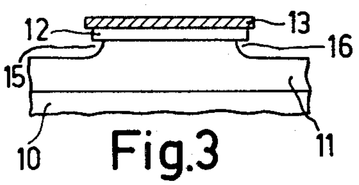
Figure 4:
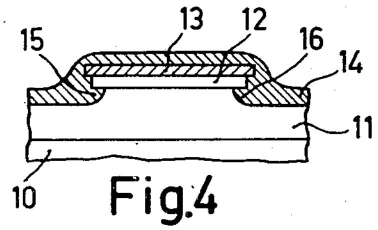

The parts of the aluminum no longer coated with the nickel layer were subsequently etched away to a depth of approximately 1 $\mu$m by means of concentrated phosphoric acid. It was then found that underetching occurred which is shown diagrammatically by means of the references 15 and 16 in FIG. 3 designating resultant crevices. To prevent further underetching a layer 14 of a positive photoresist was provided (FIG. 4) on the surface. The photoresist was a product from the firm of Shipley.

Figure 5:
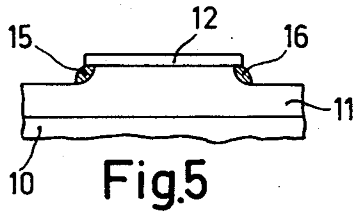

The photoresist layer 14 was then exposed to radiation. Those parts of the photoresist provided in the cavities 15 and 16 produced during etching of the aluminum surface 11 and under the nickel mask layer 12, were shielded from exposure due to the overlying nickel mask. After washing off the exposed parts of the photoresist layer there remained photoresist in these cavities 15 and 16 which protect the aluminum surface locally from the etchant and thus prevent further underetching (FIG. 5).

Figure 6:
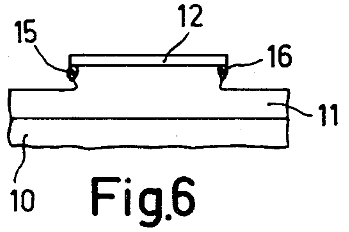

The aluminum surface was then further etched until a certain extent of underetching was reached again (FIG. 6). The method shown diagrammatically in FIGS. 1 to 5 may then be repeated if desired. The method described in this Example may be used, for example, for manufacturing beam leads.

In the manufacture of planar RF transistors it is often necessary to make a second window at a very short distance from a window in the oxide layer. The first window is, for example, the emitter window while the second window must then serve as the base window.

It is possible to achieve this by means of a photoetching technique. For the manufacture of the second window a photomask must be aligned very accurately.

The following Example II and the FIGS. 7 to 12 show the possibility of using the method according to the invention in a method of manufacturing planar transistors.

EXAMPLE II

Figure 7:
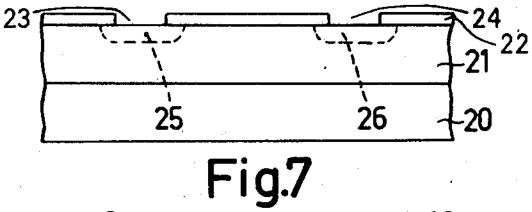
FIGS. 7 to 11 show stages of an embodiment of the method according to the invention in which a photoresist is provided immediately after providing the mask and only thereafter etching is performed.
Figure 8:
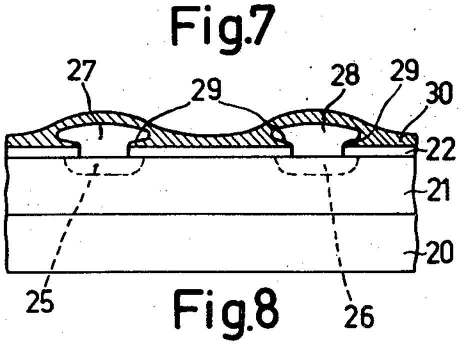
Figure 9:
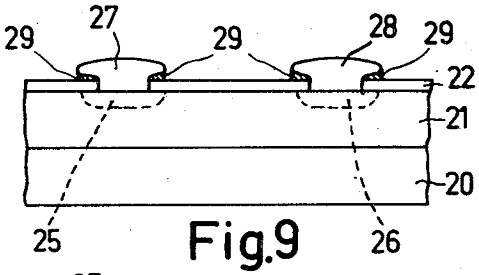

A body of germanium shown in a cross-section in FIG. 7 was used as a starting material. The collector layer 20 is of the N-type (doped with Sb), the base layer 21 is of the P-type (gallium doped), the layer 22 to be etched comprises $SiO_2$ wherein the windows 23 and 24 are etched out. These windows have a diameter of 1 $\mu$m, the distance between the windows 23 and 24 (center-to center) is 4 $\mu$. Emitter layers 25 and 26 (N-type) are obtained by diffusing arsenic into the base layer in accordance with techniques known per se.

Nickel 27, 28 to serve as a mask was then deposited electrolitically in the emitter windows 23 and 24.

The nickel was provided for such a long period that the nickel layer also grows on the $SiO_2$. However, in practice, nickel is found to be insufficiently adherent to $SiO_2$. To avoid etching of the layer under the nickel surface as much as possible during etching of the $SiO_2$ layer the following operations were carried out.

The nickel layer was etched for a short period with diluted nitric acid.

Subsequently the $SiO_2$ layer 22 and the nickel layers 27 and 28 were covered with a positive photoresist layer 30 which photoresist also enters the capillary spaces or crevices 29 between the nickel layers 27 and 28 and the $SiO_2$ layer 22 which spaces are formed during etching of the nickel layer with diluted nitric acid.

Figure 10:
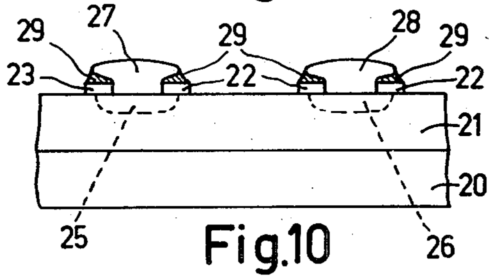
Figure 11:
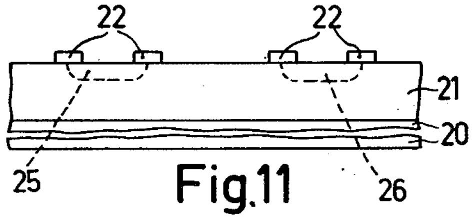

The surface coated with the photoresist layer 30 was subsequently exposed to radiation while using a mask (not shown) which shields that part of the resist layer from exposure underneath which the $SiO_2$ layer is present which, when contacts are applied, must prevent short-circuit between emitter and base regions in the area where the emitter electrode will be provided, while also the resist in the capillary spaces 29 is shielded from exposure. The exposed parts of the resist layer 30 were subsequently dissolved in a developer suitable for this purpose. The situation now is the one shown in FIG. 9. The $SiO_2$ layer was subsequently etched away with an $NH_4F$-HF solution in water, the nickel layers 27 and 28 and the resist that has been left serving as etching masks. The situation shown in FIG. 10 is now obtained. Subsequently nickel 27 and 28 and the resist were removed by means of nitric acid and an organic solvent (FIG. 11).

The transistor was then finished by providing contacts in known manner on the exposed emitter and base surfaces.

Figure 12:
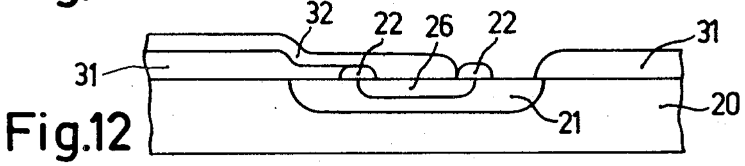

For the purpose of explanation reference is made to FIG. 12, which is a cross-sectional view perpendicular to the cross-sections shown in the previous Figures and which shows that the $SiO_2$ layer 22 which serves for protection of the N-P junction of emitter-base region 26-21 is partially connected to an $SiO_2$ layer 31 which serves inter alia for protection of the P-N junction of the base-collector region 21–20. A lead-out electrode 32 is provided across the connecting point, which electrode is supported by the $SiO_2$ layer 27 and serves as the emitter electrode.

The method according to the invention particularly provides the advantage that protection of the jeopardized areas from the etchant can be obtained in a simple manner in all those cases wherein underetching must be suppressed or must be avoided as much as possible The method according to the invention may be used for etching deep grooves for the manufacture of beam lead, the manufacture of planar RF transistors and other semiconductor devices, such as integrated circuits.

What is claimed is:

1. A method of removing by etching first portions of a surface layer while leaving a second portion of the surface layer intact and without excessive underetching of the second portion, comprising:

a. forming on the surface so as to cover the second portion a non-deformable mask which is etch-resistant and which is radiation-impermeable leaving underneath the non-deformable mask edges crevices which are exposed and accessible to an etchant to be later used, b. coating the surface including the mask, the first surface portion and the crevices underneath the mask with a positive radiation-sensitive etch-resistant layer, c. exposing the radiation-sensitive etch-resistant layer from above the non-deformable mask to radiation to which the mask is impermeable but the etch-resistant layer sensitive whereby the layer portions in the crevices and shielded by the mask remain unexposed to the radiation, possible.

d. selectively removing exposed portions of the radiation-sensitive etch-resistant layer leaving unexposed etch-resistant layer portions in the crevices, e. and thereafter while the mask and etch-resistant layer portions remain in place subjecting the surface layer to an etching treatment with an etchant to which the mask and the etch-resistant layer portions remaining are resistant until the first surface portions are removed.

2. A method as claimed in claim 1 wherein the mask is of metal.

3. A method as claimed in claim 2 wherein the mask is of nickel.

4. A method of removing by etching first portions of a surface layer while leaving a second portion of the surface layer intact and without excessive underetching of the second portion, comprising:

a. forming on the surface so as to cover the second portion a non-deformable mask which is etch-resistant and which is radiation-impermeable, b. subjecting the first surface portions to a first etching treatment with an etchant to which the mask is resistant until some first surface portions are removed including an underetched area underneath the non-deformable mask edges, c. coating the surface including the mask, the etched first surface portions and the underetched area underneath the mask with a positive radiation-sensitive etch-resistant layer, d. exposing the radiation-sensitive etch-resistant layer from above the non-deformable mask to radiation to which the mask is impermeable but the etch-resistant layer sensitive whereby the layer portions in the underetched area and shielded by the mask remain unexposed to the radiation, e. selectively removing exposed portions of the radiation-sensitive etch-resistant layer leaving unexposed etch-resistant layer portions in the underetched area, f. and thereafter while the mask and etch-resistant layer portions remain in place subjecting the surface layer to a second etching treatment with an etchant to which the mask and the etch-resistant layer portions remaining are resistant until additional regions of the first surface portions are removed.

5. A method as set forth in claim 4 wherein the mask is of metal with a thickness of at least of the order of 0.1 micrometers.

* * * * *